(12) United States Patent
Ramesh et al.

(10) Patent No.: US 6,226,507 B1
(45) Date of Patent: May 1, 2001

(54) APPARATUS AND METHOD FOR SELECTING BETWEEN A PLURALITY OF ANTENNAS UTILIZED BY A MICROCELLULAR COMMUNICATIONS TERMINAL FOR RECEPTION OF A SIGNAL

(75) Inventors: Rajaram Ramesh; Sandeep Chennakeshu, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/017,829

(22) Filed: Feb. 3, 1998

(51) Int. Cl.[7] ....................................................... H04B 1/06
(52) U.S. Cl. .................... 455/277.1; 455/277.2; 455/278.1; 375/347
(58) Field of Search ................. 455/277.1, 277.2, 455/278.1, 279.1, 273, 284; 375/347

(56) References Cited

U.S. PATENT DOCUMENTS

| | | | |
|---|---|---|---|
| 5,396,656 | * | 3/1995 | Jasper et al. .......................... 455/295 |
| 5,574,466 | * | 11/1996 | Reed et al. ............................ 342/359 |
| 5,692,019 | * | 11/1997 | Chang et al. ......................... 375/347 |
| 5,748,139 | * | 5/1998 | Kawakami et al. .................... 342/51 |
| 5,901,346 | * | 5/1999 | Stengel et al. ........................ 455/126 |
| 5,940,430 | * | 8/1999 | Lowe et al. ........................... 455/442 |
| 5,940,452 | * | 8/1999 | Rich ...................................... 375/347 |
| 6,006,111 | * | 12/1999 | Rowland .............................. 455/461 |
| 6,018,651 | * | 1/2000 | Bruckert et al. .................. 455/277.1 |
| 6,023,615 | * | 2/2000 | Bruckert et al. .................. 455/277.2 |

FOREIGN PATENT DOCUMENTS

| | | |
|---|---|---|
| 0 477 158 A2 | 3/1992 | (EP) . |
| 0 798 878 A2 | 10/1997 | (EP) . |

\* cited by examiner

Primary Examiner—Thanh Cong Le
Assistant Examiner—Thuan T. Nguyen
(74) Attorney, Agent, or Firm—Davidson & Gribell, LLP (57) ABSTRACT

An apparatus and method for selecting between a plurality of antennas utilized by a microcellular communications terminal for reception of a signal, wherein a gain imbalance exists between the antennas.

63 Claims, 5 Drawing Sheets

APPARATUS AND METHOD FOR SELECTING BETWEEN A PLURALITY OF ANTENNAS UTILIZED BY A MICROCELLULAR COMMUNICATIONS TERMINAL FOR RECEPTION OF A SIGNAL

BACKGROUND OF THE INVENTION

1. Field of the Invention

The present invention relates generally to microcellular communications terminals utilizing at least two antennas for reception of a signal and, more particularly, to an apparatus and method for selecting between a plurality of antennas having unequal gains to receive such signal.

2. Description of Related Art

Antenna diversity is a commonly used technique to overcome the effects of fading, which is typically the dominant impairment in wireless communication. The most common methods of performing diversity combining are maximal ratio combining (MRC), equal gain combining (EGC) and selection combining (SC). It has been found, however, that MRC and EGC require the co-phasing of the signals from the antennas before combining, which is difficult in practice.

While diversity combining can be performed either before or after detection of a signal, pre-detection selection combining, or pre-selection diversity, is preferred since it requires a terminal to have only a single receive chain and is therefore less expensive. At the same time, it will be understood that the signal format must allow sampling (or receipt) of the signal on the antennas prior to reception. Thus, pre-selection diversity is more suited to systems with slotted modes of transmission (e.g., TDMA systems). It will also be noted that pre-selection diversity is appropriate only when the fading rates on the signal are low enough to assume that the sample of the channel obtained at the beginning of the slot is valid for the duration of the entire slot. An example of a diversity receiving system is disclosed in U.S. Pat. No. 5,361,404 to Dent, which is also assigned to the owner of the present invention and is hereby incorporated by reference herein.

Pre-selection diversity has been utilized previously, but this process of determining the best performer at a given time has involved antennas with equal gains. One concern with the use of antenna diversity in a microcellular communications terminal is that the second antenna typically has a smaller gain than the main antenna. This oftentimes stems from the second antenna being located internal to the terminal for aesthetic purposes, where a user's hand wrapped around the terminal serves to reduce the gain of such second antenna. Since large gain differentials have been experienced (e.g., up to 4 dB in some cases), they must be taken into account or the receiving system will almost always choose the antenna having the greater gain even if the carrier power/interference ratio from the antenna having the lesser gain would otherwise have been larger.

Accordingly, it is a primary object of the present invention to provide an apparatus and method for selecting between a plurality of antennas utilized by a microcellular communications terminal for reception of a signal when such antennas have unequal gains.

It is another object of the present invention to provide an apparatus and method for selecting between a plurality of antennas utilized by a microcellular communications terminal for reception of a signal using preselection diversity.

It is still another object of the present invention to provide an apparatus and method for selecting between a plurality of antennas utilized by a microcellular communications terminal for reception of a signal in which the gain difference between such antennas is determined and/or continuously updated.

Yet another object of the present invention is to provide an apparatus and method for selecting between a plurality of antennas utilized by a microcellular communications terminal for reception of a signal which takes into account noise and interference encountered by the antennas.

These objects and other features of the present invention will become more readily apparent upon reference to the following description when taken in conjunction with the following drawings.

SUMMARY OF THE INVENTION

In accordance with a first aspect of the present invention, a method of selecting between a plurality of antennas utilized by a microcellular communications terminal for reception of a signal is disclosed, where a gain imbalance exists between the antennas. The method includes the steps of measuring the power of the signal received by each antenna and selecting one of the antennas for reception of the signal based on the measured power of the signal received by each antenna and the gain imbalance. This method also may include the steps of compensating for the gain imbalance between the antennas to derive a compensated signal power for each antenna, comparing the compensated signal powers of the antennas, and selecting the antenna having the greatest compensated signal power for reception of the signal. The method may further include determining and/or updating the gain imbalance between the antennas, as well as adjusting a gain imbalance factor applied to the measured signal power for each antenna depending on noise and interference encountered by the antennas.

In accordance with a second aspect of the present invention, an alternative method of selecting between a plurality of antennas utilized by a microcellular communications terminal for reception of a signal is disclosed where a gain imbalance exists between the antennas. This method includes the steps of receiving the signal by all the antennas concurrently, weighting the signals received by each antenna according to certain desired conditions, combining the signals received by each antenna, measuring the power of the combined signal received by the antennas for each weighted condition, and selecting one of the combined signals for reception of the signal based on the measured power of the combined signals received and the gain imbalance between the antennas. This method further includes the steps of compensating for the gain imbalance between the antennas to derive a compensated signal power for each combined signal, storing the compensated signal power for each combined signal, comparing the compensated signal powers for all the combined signals, and selecting the combined signal having the greatest compensated signal power for reception of the signal. The method may also include determining and/or updating the gain imbalance between the antennas, as well as adjusting the compensated signal power for each combined signal depending on noise and interference encountered by the antennas.

In accordance with a third aspect of the present invention, a receiver for a microcellular communications terminal is disclosed, wherein the terminal includes a plurality of antennas having different gains for receiving a signal. The receiver includes a circuit for measuring power of the signal received by each antenna, a control for selecting one of the antennas for reception of the signal after compensating for the gain differential between the antennas, and a switching device activated by the control which permits reception of the signal only from the selected antenna.

In accordance with a fourth aspect of the present invention, a receiver for a microcellular communications terminal is disclosed, wherein the terminal includes a plurality of antennas having different gains for receiving a signal. The receiver includes a circuit for measuring power of the signal received by the antennas and a control for weighting the reception of said signal by said antennas to provide a combined signal for certain desired conditions, said control selecting a combined signal which provides the greatest signal power taking into account the gain differential between said antennas.

In accordance with a fifth aspect of the present invention, a diversity receiving system for a microcellular communications terminal is disclosed as including at least two antennas of unequal gain for receiving a signal. A receiver for demodulating the signal is provided which includes a control for selecting prior to such demodulation which antenna to receive the signal based upon signal power of each antenna measured during receiving of the signal, wherein the measured signal power is modified by a gain imbalance factor.

In accordance with a sixth aspect of the present invention, a method of selecting among a plurality of antennas utilized by a microcellular communications terminal for reception of a signal is disclosed, where a gain imbalance exists between the antennas. The method includes the steps of receiving the signal by all the antennas concurrently, weighting the signals received by each antenna according to certain desired conditions, combining the signals received by each antenna, measuring the power of the combined signal received by the antennas for each weighted condition, and determining whether the signal power for a combined signal in which the signals received by each antenna are weighted substantially equally is greater than a sum of the signal powers for all other combined signals. The method also includes the step of selecting the combined signal under the substantially equally weighted condition for reception of the signal when the signal power thereof is greater than the sum of the signal powers for all other combined signals or selecting one of the combined signals from the non-equally weighted conditions for reception of the signal when the signal power of the combined signal under the substantially equally weighted condition is not greater than the sum of the signal powers for all other combined signals.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
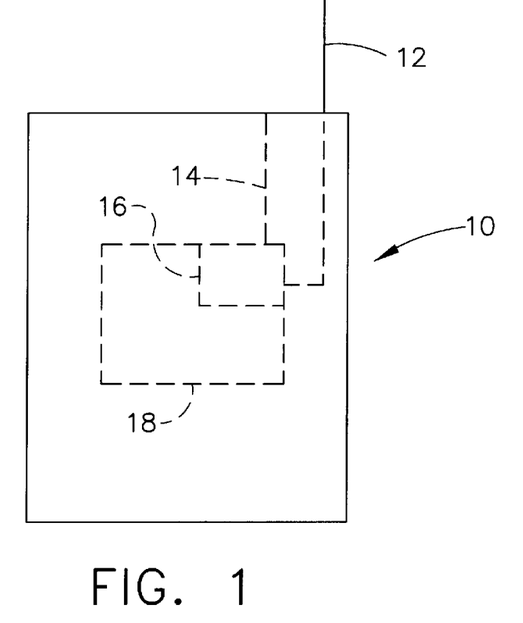
FIG. 1 is a schematic representation of a microcellular communications terminal utilizing a plurality of antennas for reception of a signal.

Referring now to the drawings in detail, wherein identical numerals indicate the same elements throughout the figures, FIG. 1 depicts a microcellular communications terminal 10 employing antenna diversity so that at least two different antennas 12 and 14 are associated therewith. Although only two antennas are shown in FIG. 1, it will be understood that any number of antennas may be utilized by terminal 10 for reception of a signal.

Figure 2:
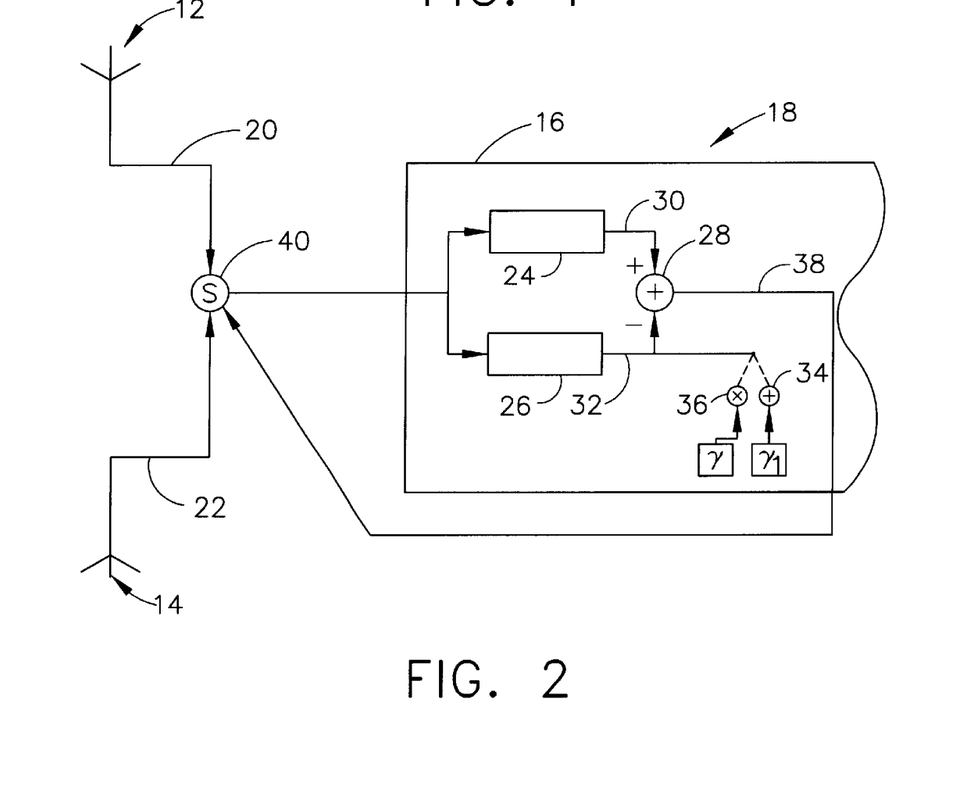
FIG. 2 is a partial schematic diagram of a receiver for the microcellular communications terminal depicted in FIG. 1 which is able to select between the plurality of antennas for reception of the signal in accordance with the present invention.

More specifically, as seen in FIG. 2, a control 16 for a receiver indicated generally by the numeral 18 is depicted in which separate signal paths 20 and 22 are connected to antennas 12 and 14, respectively. It will be understood that receiver 18 is used to demodulate the signals received on antennas 12 and 14, and, other than the functionality of control 16, is well known in the art. Using a pre-selection diversity scheme, control 16 preferably measures the instantaneous signal strength (RSSI) or power of a signal received over antennas 12 and 14 immediately prior to the desired slot, as indicated by signal measuring circuits 24 and 26, which may be either analog or digital in form and are well known in the art. Preferably, signal power measuring circuits 24 and 26 are part of a microprocessor in control 16 which performs the necessary squaring and integrating functions for obtaining the desired power measurements.

A summing junction 28 is provided in control 16 in order to compare the power difference between signals 30 and 32 received from signal measuring circuits 24 and 26, respectively. It will be noted that signal 30 is given a positive designation and signal 32 is given a negative designation so that the summing of such signals is indicative of the signal power difference received over antennas 12 and 14. It will further be appreciated that a gain imbalance factor $\gamma$ (designated $\gamma_1$ when the gains of antennas 12 and 14 are measured in dB) is multiplied (or added in the case of $\gamma_1$) to either of signals 30 and 32 in order to compensate for the difference in gains between antennas 12 and 14.

If, for example, it is known or determined that antenna 12 has a gain $\gamma$ times greater than antenna 14 (as depicted in FIG. 2), the selection of which antenna is more desirable for reception of the signal is determined by the equation $$P_1 > \gamma P_2,$$

where $P_1$ is the measured power of antenna 12 and $P_2$ is the measured power of antenna 14. It will be seen that antenna 12 is selected for reception of the signal by control 16 of receiver 18 when the above equation is true and antenna 14 is otherwise selected. Of course, should it be known or determined that antenna 14 has a gain $\gamma$ times greater than antenna 12, the selection of which antenna is more desirable for reception of the signal is similarly determined by the equation $$P_2 > \gamma P_1,$$

where antenna 14 is selected for reception of the signal by control 22 of receiver 16 when the aforementioned equation is true and antenna 12 is otherwise selected.

In the case where powers $P_1$ and $P_2$ are measured logarithmically, the determinative equation takes the form $$P_1 > P_2 + \gamma_1,$$

where $\gamma_1$ is the gain imbalance factor in decibels (dB) between antennas 12 and 14. As shown in FIG. 2, a summing junction 34 is then provided so that $\gamma_1$ is added to signal 32. Of course, it will be recognized that a multiplier 36 will provide multiplication of gain imbalance factor $\gamma$ and signal 32 when the signal powers are not measured logarithmically. In either scenario, control 16 compensates for the gain imbalance between antennas 12 and 14 so that the measured signal powers therefrom may be compared as if received by antennas of substantially equal gain. This type of selection method is important since it indicates which antenna has a higher likelihood of a better carrier power-to-interference power (C/I) ratio for the signal received and not just which antenna has the greater signal strength.

A feedback signal 38 from summing junction 28 in control 16 is then used to activate a switching device 40 which permits reception of the signal from only the selected antenna and the signal path associated therewith for a designated time period (typically for three slots).

It will be appreciated that the gain imbalance between antennas 12 and 14 may be known in some instances and not in others. In the situation where the gain imbalance is not known, it will need to be determined so that the measured signal powers may be compensated accordingly. When the gain imbalance between the antennas is known initially or otherwise predetermined, it still will preferably be updated periodically. A preferred way of determining and/or updating the gain imbalance in this embodiment is by averaging the instantaneous signal strength from each antenna for a predetermined period of time (dependent upon the current Doppler frequency, but can easily be accomplished within a few minutes during a phone call) and then calculating the difference therebetween. In this way, most of the radio channel impairments can be averaged out. Whether the aforementioned method of determining/updating the gain imbalance between antennas is used, or one comparable thereto, the preference is that it be based on actual experience with the antennas.

Further, the gain imbalance factor (or indirectly, the compensated signal powers) used in the above equations may be fine-tuned by taking into account the noise and/or interference encountered by antennas 12 and 14. For example, the gain imbalance factor is substantially negligible (i.e., $\gamma$ is substantially unity and $\gamma_1$ is substantially zero, respectively) when antennas 12 and 14 are in a noise-limited environment and substantially equal to the actual gain imbalance between such antennas when in an interference-limited environment ($\gamma_1$ or $\gamma$ depending on whether the signal is measured logarithmically or not). In the instance where antennas 12 and 14 are in an environment having a combination of noise and interference, gain imbalance factor $\gamma$ is modified according to a predetermined relationship obtained from the RSSI of each antenna which is empirically determined from carrier and interference power measurements throughout the cellular system.

When microcellular communications terminal 10 operates within a sleep mode (i.e., it is not actively transmitting) but sporadically receiving a signal, only one of antennas 12 and 14 will optimally be maintained with a standby current thereto. This is done in order to reduce the standby current during the sleep mode. Typically, the antenna having the largest gain (i.e., antenna 12 as indicated hereinabove) will be used. During a normal call, however, the other antenna(s) is activated and the aforementioned selection process takes place.

Figure 3:
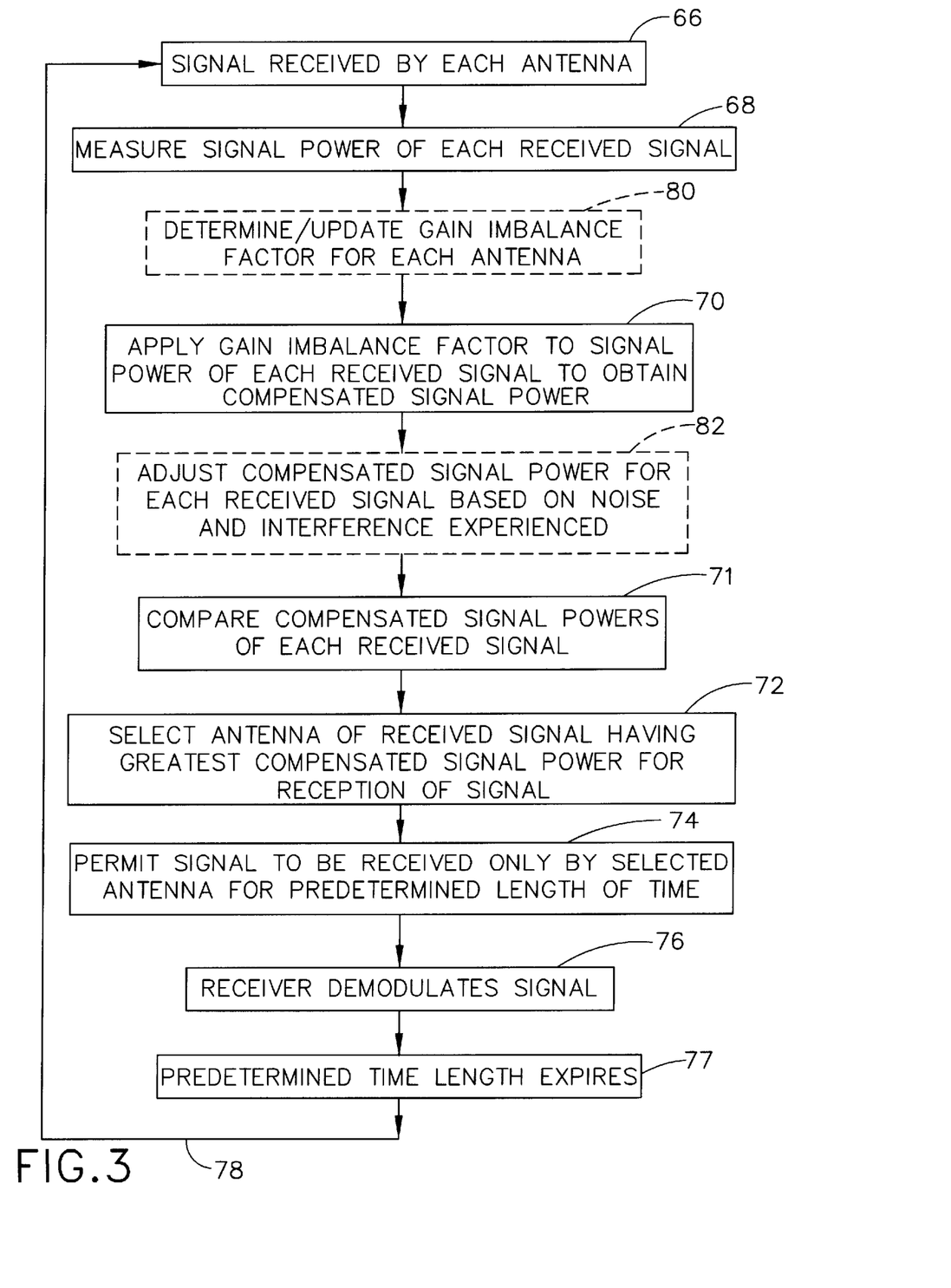
FIG. 3 is a flow diagram of the steps undertaken in the receiver control depicted in FIG. 2 by which the desired antenna for reception of a signal is selected.

It will be seen from FIG. 3 that control 16 of receiver 18 operates by performing the following process. First, the signal is received by each antenna for a predetermined time period (box 66) prior to the desired slot and the instantaneous signal power measured therefor (box 68). It will be understood that the predetermined time periods for receiving such signal by each antenna will be disjoint or during different time intervals. For example, receiver 18 will typically receive a signal (e.g., a TDMA-type signal having three slots with a duration of approximately 6 milliseconds each) through each antenna 12 and 14 for a brief time period (e.g., 0.5 milliseconds) immediately prior to the slot assigned thereto.

The signal power for each antenna is then compensated for by applying the gain imbalance factor in order to determine a compensated signal power for the received signal of each such antenna (box 70), which is then compared to the compensated signal power for the received signal of the other antenna(s) (box 71). It will be understood that the gain imbalance factor $\gamma$ of the antenna having the greatest gain is one ($\gamma_1$ being zero). Based on the measurements of the received signals and the compensation thereof as discussed hereinabove, control 16 selects the antenna having the greatest compensated signal power for receiving the signal (box 72) during the intended time slot (e.g., approximately 6 milliseconds). Once the desired antenna is selected for reception of the signal, signal 38 is sent to switching device 40 in order to prevent the signal from being received on the other antenna(s) for a predetermined length of time (box 74). The signal is then demodulated by receiver 16 during the time slot for use by terminal 10 (box 76) until the predetermined time length expires (box 77). It will be seen that the process is repeated periodically (e.g., every cycle of the time slots or approximately 20 milliseconds) via a feedback loop 78 to continuously determine the preferred antenna for reception of the signal.

As stated herein, the gain imbalance between antennas may have to be determined or updated prior to obtaining the compensated signal power for each antenna (as represented in dashed box 80 of FIG. 3). Also, the compensated signal power from each antenna is preferably adjusted based on the noise and/or interference encountered by antennas 12 and 14 (see dashed box 82).

Figure 4:
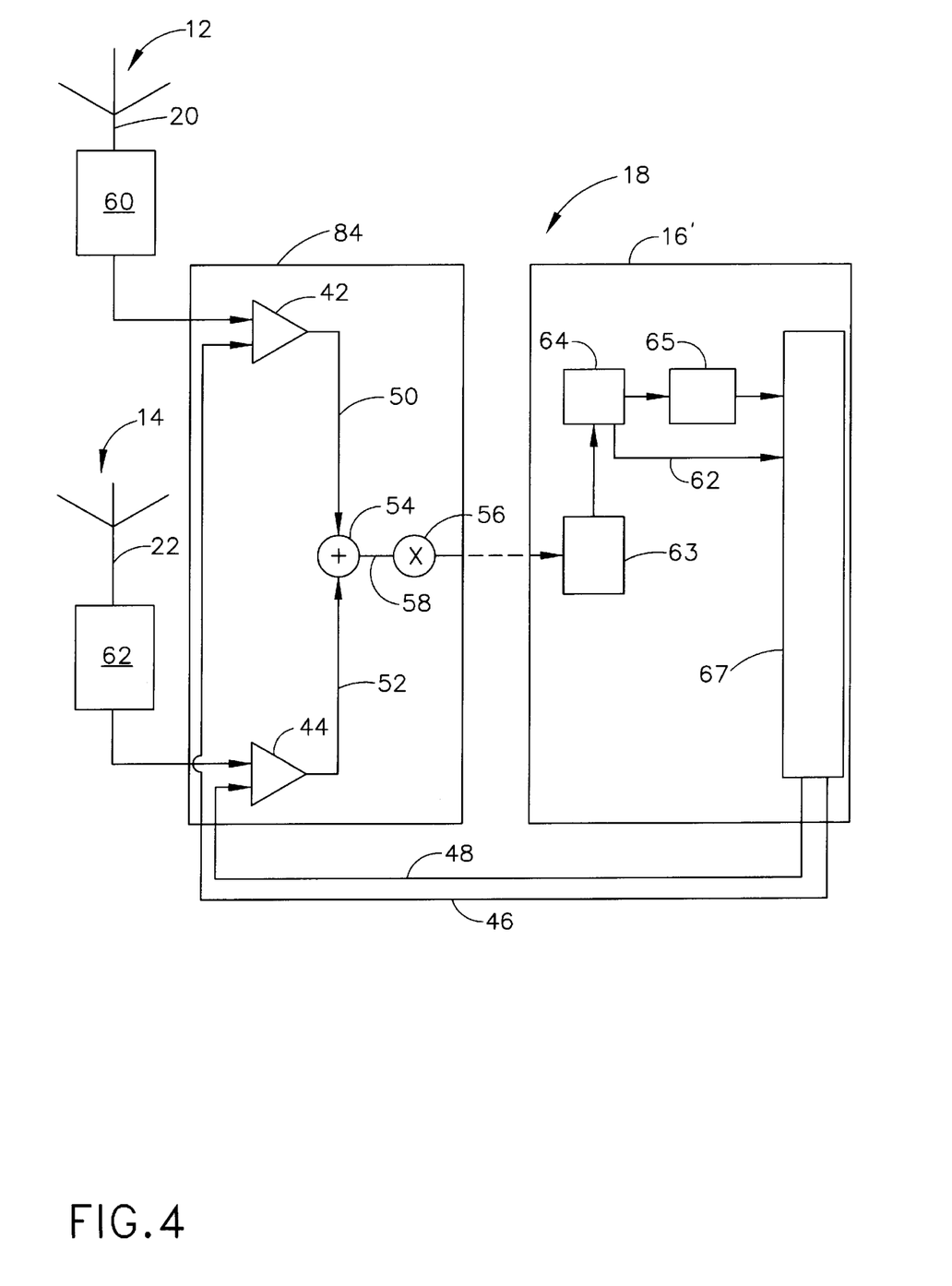
FIG. 4 is a partial schematic diagram of an alternative receiver embodiment for the microcellular communications terminal utilizing a plurality of antennas as depicted in FIG. 1 which also is able to select between the plurality of antennas for reception of the signal in accordance with the present invention.

In order to eliminate switch 40 (which typically is lossy), it will be seen in FIG. 4 that receiver 18 may be modified to include an RF/IF port 84 which includes first and second low noise amplifiers 42 and 44 connected to signal paths 20 and 22, respectively, with the logic of a control 16' sending control signals 46 and 48 thereto. It will be seen that outputs 50 and 52 of low noise amplifiers 42 and 44 are summed at summing junction 54, with control signals 46 and 48 being used to adjust the respective gains of amplifiers 40 and 42, and outputs 50 and 52 being weighted therefrom. More specifically, low noise amplifiers 42 and 44 will be weighted in at least the following ways: (1) low noise amplifier 42 is weighted with a "1" and low noise amplifier 44 is weighted with a "0" so that the power of the signal received is from first antenna 12 and is designated $P_1$; (2) low noise amplifier 42 is weighted with a "0" and low noise amplifier 44 is weighted with a "1" so that the power of the signal received is from second antenna 14 and is designated $P_2$; and (3) low noise amplifier 42 and low noise amplifier 44 are both weighted with a "1" and the power of the signal received from first and second antennas 12 and 14 is designated $P_{12}$. Of course, any number of other desired weighted conditions can be initiated by control signals 46 and 48.

It will further be seen that a synthesizer 56 is preferably connected in series with summing junction 54 in order to mix signal 58 therefrom down to an intermediate frequency which is easier to digitize. Filters 60 and 62 (e.g., of the surface acoustic wave or SAW type) are preferably provided within signal paths 20 and 22, respectively, upstream of RF/IF port 84 to limit the bandwidth of the signal received by antennas 12 and 14. Another bandwidth filter 63 and an automatic gain control 64 are preferably located in control 16' immediately downstream of synthesizer 56 in order to further assist in keeping the signal within a predetermined bandwidth range and the gains of amplifiers 42 and 44 within a desired range prior to being input into signal power measuring circuit 65.

Once the instantaneous signal power is measured by signal power measuring circuit 65 for the various weighted conditions of amplifiers 42 and 44 described above, a microprocessor 67 preferably is utilized to determine whether signal power $P_{12}$ is greater than the sum of signal powers $P_1$ and $P_2$. If this is the case, then the combined signal stemming from this equally weighted condition of low noise amplifiers 42 and 44 ("1" for each) will be selected regardless of any difference in gain between antennas 12 and 14. If signal power $P_{12}$ is not greater than the sum of signal powers $P_1$ and $P_2$, then microprocessor 67 will separately compensate signal powers $P_1$ and $P_2$ in light of any gain differential between antennas 12 and 14. The compensated signal power for the combined signal of each non-equally weighted condition is then stored in microprocessor 67 and compared to the compensated signal powers of combined signals for the other non-equally weighted condition(s) of the amplifiers, whereupon the combined signal providing the greatest compensated signal power is selected and the logic within microprocessor 67 provides the relevant control signals 46 and 48 to amplifiers 42 and 44, respectively. Of course, a threshold value may be applied to the compensated signal power stored in microprocessor 67 to reflect the noise and/or interference experienced by antennas 12 and 14. Further, it will be appreciated that any number of combined signals, created by an applicable non-equally weighted condition for amplifiers 40 and 42, may be measured and compared (not just the specific conditions identified previously).

As stated hereinabove, the gain imbalance between antennas 12 and 14 may or may not be known initially, but in any event will preferably be updated periodically. For the embodiment depicted in FIG. 4, a preferred way of determining and/or updating the gain imbalance between antennas is to record the gains employed by automatic gain control device 64 and calculating the difference therebetween. This can be accomplished by microprocessor 67 via a separate input 62 and is possible since the compensation performed by automatic gain control 64 is directly related to the initial amplitude thereto.

Figure 5A:
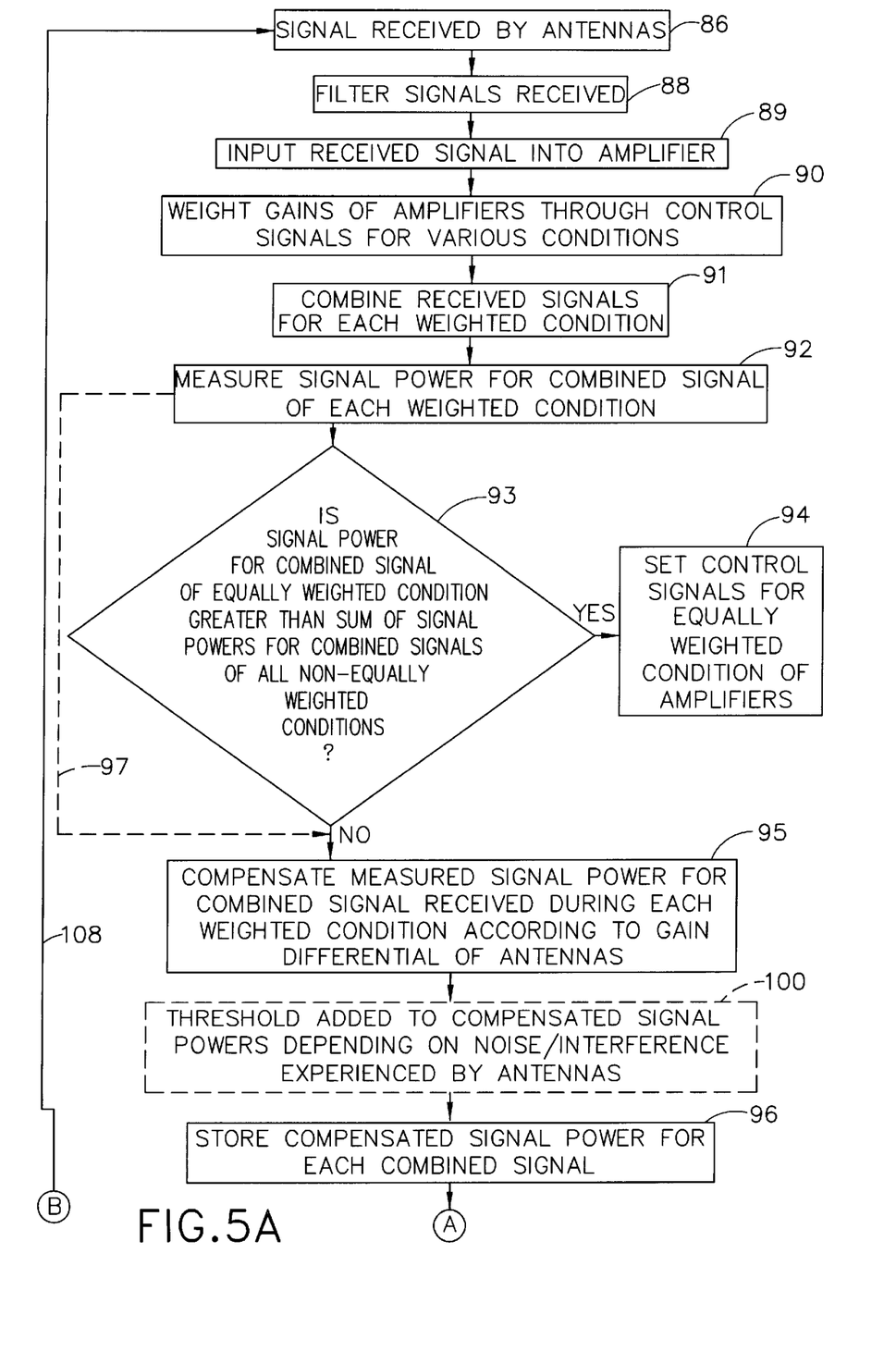
FIGS. 5A and 5B are a flow diagram of the steps undertaken in the receiver control depicted in FIG. 4 by which the desired antenna for reception of a signal is selected.
Figure 5B:
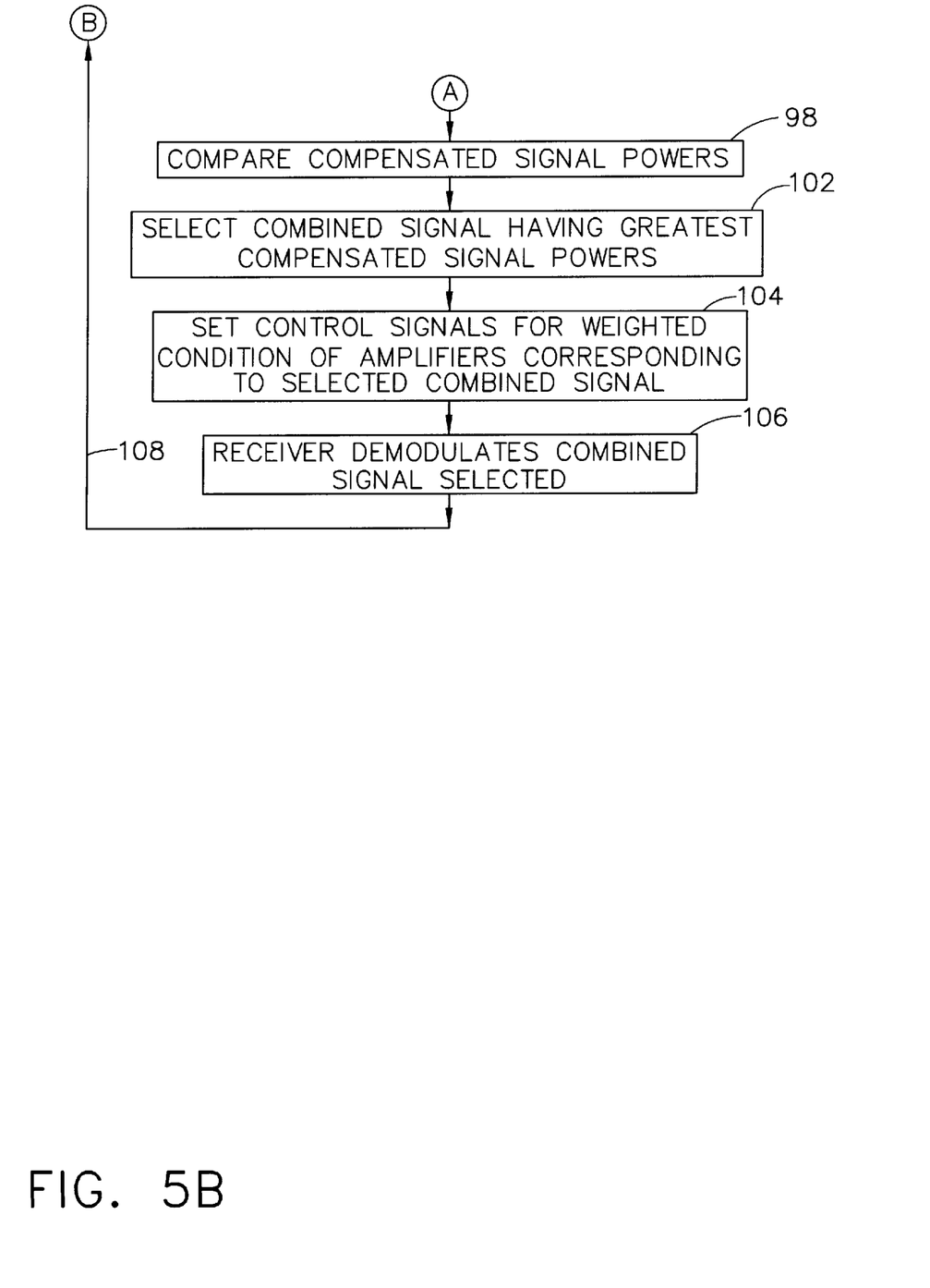

As seen in the flow chart of FIG. 5, control 16' of receiver 18 operates as modified to receive the signal by both antennas for a predetermined time period (box 86). Prior to measuring the instantaneous signal power of the received signals, however, such signals are preferably filtered at least once to limit the bandwidth thereof (box 88). The respective signals from each antenna are input into low noise amplifiers 42 and 44 (box 89), where the gains applied thereto are weighted by control signals 46 and 48 for various conditions (box 90). The received signals from each antenna are then combined by summing junction 54 for each weighted condition (box 91). In this way, combined signal 58 is controlled so that the instantaneous signal power thereof can be measured for each weighted condition (box 92).

At this point, it is preferred that control 16' determine whether the measured signal power for a weighted condition in which low power amplifiers 42 and 44 are substantially equally weighted (i.e., each set "high" or at "1") is greater than a sum of the signal powers measured for the other weighted conditions (e.g., if $P_{12}>P_1+P_2$). This inquiry is shown in decision box 93. If the answer is yes, then the combined signal under the substantially equally weighted condition is used for reception of the signal and control signals 46 and 48 are set accordingly by microprocessor 67 (box 94). If the answer to this determination is negative, then the signal power measured for the combined signal of each non-equally weighted condition is compensated to account for gain differentials between the antennas (box 95), the compensated signal power for each combined signal is stored by control 16' (box 96), and then compared (box 98). It will be appreciated that the preferred step represented by decision box 93 may be omitted, with the process continuing directly from the step in box 92 to that in box 95 (see dashed line 97).

Depending upon the noise and interference experienced by antennas 12 and 14, a threshold is preferably added to the compensated signal power (dashed box 100) of each combined signal prior to the storing and comparing steps. In any event, the logic of microprocessor 67 selects the combined signal providing the greatest compensated signal power (box 102) and sets control signals 46 and 48 accordingly (box 104). It is through control signals 46 and 48, then, that the gains of amplifiers 42 and 44 are provided to the respective signals received from antennas 12 and 14 and the proportionate amount thereof is determined. At this time, receiver 18 demodulates the combined signal selected (box 106).

It is preferred that the setting of such control signals remains for a predetermined number of slots so that the received signal is demodulated by the receiver for use by the terminal. As with the embodiment previously described hereinabove, a feedback loop 108 is provided so that the process can be repeated periodically by the antennas and the desired combined signal (i.e., the weighted condition of the amplifiers therefor) utilized by receiver 18 is continuously updated.

Having shown and described the preferred embodiment of the present invention, further adaptations of the apparatus and method for selecting between a plurality of antennas utilized by a microcellular communications terminal can be accomplished by appropriate modifications by one of ordinary skill in the art without departing from the scope of the invention.

What is claimed is:

1. A method of selecting between a plurality of antennas utilized by a microcellular communications terminal for reception of a signal, wherein a gain imbalance exists between said antennas, comprising the following steps:

(a) measuring the power of said signal received by each antenna;

(b) compensating for said gain imbalance between said antennas to derive a compensated signal power for each antenna which permits the reception of said signal by said antennas to be compared as having equal gains;

(c) comparing the compensated signal powers of said antennas; and (d) selecting the antenna having the greatest compensated signal power for reception of said signal.

2. The antenna selection method of claim 1, said compensating step further comprising multiplying the measured signal power of each antenna by a gain imbalance factor.

3. The antenna selection method of claim 1, said compensating step further comprising adding a gain imbalance factor to the measured signal power of each antenna.

4. The antenna selection method of claim 3, wherein said measured signal power of each antenna is measured in logarithmic form.

5. The antenna selection method of claim 1, wherein said gain imbalance between said antennas is known.

6. The antenna selection method of claim 1, further comprising the step of determining the gain imbalance between said antennas prior to said selecting step.

7. The antenna selection method of claim 6, said gain imbalance determining step further comprising:
   (a) averaging the instantaneous signal strength from each antenna for a predetermined time period; and
   (b) calculating the difference therebetween.

8. The antenna selection method of claim 1, further comprising the step of adjusting said compensated signal power for each antenna based on noise encountered by said antennas.

9. The antenna selection method of claim 1, further comprising the step of adjusting said compensated signal power for each antenna based on interference encountered by said antennas.

10. The antenna selection method of claim 8, wherein said gain imbalance factor is substantially negligible when said antennas are noise limited.

11. The antenna selection method of claim 9, wherein said gain imbalance factor is substantially equal to said gain imbalance between said antennas when said antennas are interference limited.

12. The antenna selection method of claim 2, wherein said gain imbalance factor is modified according to a predetermined relationship obtained from the instantaneous signal strength received by each antenna.

13. The antenna selection method of claim 3, wherein said gain imbalance factor is modified according to a predetermined relationship obtained from the instantaneous signal strength received by each antenna.

14. The antenna selection method of claim 1, further comprising the step of ensuring said signal is received only from said selected antenna for a predetermined time period.

15. The antenna selection method of claim 1, further comprising the step of maintaining only one of said antennas with standby current when said terminal is in a sleep mode until reception of said signal.

16. The antenna selection method of claim 1, wherein said measuring step occurs during different time periods for each antenna.

17. The antenna selection method of claim 1, further comprising the following steps:
   (a) continuously and periodically repeating said measuring, compensating, comparing, and selecting steps; and
   (b) updating the antenna selection for reception of said signal to the antenna having the greatest compensated signal power.

18. The antenna selection method of claim 1, wherein said selecting step occurs prior to demodulation of said signal.

19. A method of selecting among a plurality of antennas utilized by a microcellular communications terminal for reception of a signal, wherein a gain imbalance exists between said antennas, comprising the following steps:
   (a) receiving the signal by all said antennas concurrently;
   (b) weighting the signals received by each said antenna according to certain desired conditions;
   (c) combining the signals received by each antenna;
   (d) compensating for said gain imbalance between said antennas to derive a compensated signal power for each combined signal;
   (e) measuring the compensated signal power of said combined signal received by said antennas for each weighted condition;
   (f) storing the compensated signal power for each combined signal;
   (g) comparing the compensated signal powers for all said combined signals; and
   (h) selecting one of said weighted conditions for reception of said signal based on the combined signal having the greatest compensated signal power.

20. The antenna selection method of claim 19, further comprising the step of filtering the signals received by said antennas to within a predetermined bandwidth.

21. The antenna selection method of claim 19, further comprising the following steps:
   (a) inputting the signal received by each antenna into an amplifier; and
   (b) controlling the gain provided to each received signal by said amplifiers for each weighted condition.

22. The antenna selection method of claim 19, wherein said gain imbalance between said antennas is known.

23. The antenna selection method of claim 19, further comprising the step of determining the gain imbalance between said antennas prior to said selecting step.

24. The antenna selection method of claim 23, said gain imbalance determining step further comprising:
   (a) recording gains from automatic gain controls used for signals from said antennas; and
   (b) calculating the difference therebetween.

25. The antenna selection method of claim 19, further comprising the step of adjusting said compensated signal power for each combined signal based on noise encountered by said antennas.

26. The antenna selection method of claim 19, further comprising the step of adjusting said compensated signal power for each combined signal based on interference encountered by said antennas.

27. The antenna selection method of claim 19, further comprising the step of ensuring said signal is received only under said selected combined signal for a specified time period.

28. The antenna selection method of claim 19, wherein said measuring step occurs during different time periods for each said combined signal.

29. The antenna selection method of claim 19, further comprising the following steps:
   (a) continuously and periodically repeating said receiving, weighting, combining, measuring, and selecting steps; and
   (b) updating the combined signal for reception of said signal to the combined signal providing the greatest compensated signal power.

30. The antenna selection method of claim 19, wherein said selecting step occurs prior to demodulation of said signal.

31. A receiver for a microcellular communications terminal, said terminal including a plurality of antennas having different gains for reception of a signal, said receiver comprising:
   (a) a circuit for measuring power of said signal received by each said antenna;
   (b) a control for selecting one of said antennas for reception of said signal, wherein the gain differential between said antennas is compensated for in said control so that reception of said signal by each antenna is considered to be received by antennas of substantially equal gain, said selected antenna having the greatest signal power after compensating for the gain differential between said antennas; and (c) a switching device activated by said control which permits reception of said signal only from said selected antenna.

32. The receiver of claim 31, wherein said control compensates for the gain differential between said antennas by multiplying the measured signal power of each antenna by a gain imbalance factor.

33. The receiver of claim 31, wherein said control compensates for the gain differential between said antennas by adding a gain imbalance factor to the measured signal power of each antenna, said signal power being measured logarithmically.

34. The receiver of claim 33, said control adjusting said gain imbalance factor based upon noise and interference encountered by said antennas.

35. The receiver of claim 34, wherein said gain imbalance factor is substantially negligible when said antennas are noise limited.

36. The receiver of claim 34, wherein said gain imbalance factor is substantially equal to said gain imbalance between said antennas when said antennas are interference limited.

37. The receiver of claim 34, wherein said gain imbalance factor is modified according to a predetermined relationship obtained from the instantaneous signal strength received by each antenna.

38. The receiver of claim 31, wherein said control maintains only one of said antennas with standby current when said terminal is in a sleep mode prior to reception of said signal.

39. The receiver of claim 31, wherein said circuit measures the signal power received by each antenna during disjoint time periods.

40. The receiver of claim 31, wherein said signal is transmitted to said terminal in a slotted mode.

41. The receiver of claim 31, wherein said signal is received by each antenna so that the power of each received signal is measured by said circuit prior to selection of one of said antennas for reception of said signal by said terminal.

42. The receiver of claim 31, wherein the gain differential between said antennas is known.

43. The receiver of claim 31, wherein the gain differential between said antennas is determined by said control.

44. A receiver for a microcellular communications terminal, said terminal including a plurality of antennas having different gains for reception of a signal, said receiver comprising:

(a) a circuit for measuring power of said signal received by said antennas; and (b) a control for weighting the reception of said signal by said antennas to provide a combined signal for certain desired conditions, wherein said control compensates the measured signal power for each combined signal due to the gain differential between said antennas, said control selecting a combined signal which provides the greatest compensated signal power.

45. The receiver of claim 44, wherein said control adjusts the compensated signal power for each said combined signal based upon noise and interference encountered by said antennas.

46. The receiver of claim 44, further comprising a low noise amplifier positioned between each antenna and said power measuring circuit, wherein each said low noise amplifier receives an input from its respective antenna and a control signal from said control for each weighted condition to produce an output therefrom.

47. The receiver of claim 44, wherein the gain differential between said antennas is known by said control.

48. The receiver of claim 44, wherein said control determines the gain differential between said antennas.

49. The receiver of claim 48, said receiver further comprising an automatic gain control, wherein the gain differential between said antennas is determined through recording gains of said automatic gain control used for signals from said antennas and calculating the difference therebetween.

50. A method of selecting among a plurality of antennas utilized by a microcellular communications terminal for reception of a signal, wherein a gain imbalance exists between said antennas, comprising the following steps:

(a) receiving the signal by all said antennas concurrently;
(b) weighting the signals received by each said antenna according to certain desired conditions;
(c) combining the signals received by each antenna;
(d) compensating for said gain imbalance between said antennas to derive a compensated signal power for each combined signal;
(e) measuring the compensated signal power of said combined signal received by said antennas for each weighted condition;
(f) storing the compensated signal power for each combined signal;
(g) comparing the compensated signal powers for all said combined signals; and
(h) determining whether the compensated signal power for a combined signal in which the signals received by each said antenna are weighted substantially equally is greater than a sum of the compensated signal powers for all the other combined signal.

51. The method of claim 50, further comprising the step of selecting for reception of said signal a combined signal under said substantially equally weighted condition when the signal power thereof is greater than a sum of the signal powers for all other combined signals.

52. The method of claim 50, further comprising the step of selecting one of said combined signals provided under a non-equally weighted condition for reception of said signal based on the measured power of said combined signal and said gain imbalance between the antennas when the signal power of said combined signal under said substantially equally weighted condition is not greater than said sum of the signal powers for all other said combined signals.

53. The antenna selection method of claim 50, further comprising the step of filtering the signal received by said antennas to within a predetermined bandwidth.

54. The antenna selection method of claim 50, further comprising the following steps:

(a) inputting the signal received by each antenna into an amplifier; and
(b) controlling the gain provided to each received signal by said amplifiers for each weighted condition.

55. The antenna selection method of claim 52, wherein said gain imbalance between said antennas is known.

56. The antenna selection method of claim 52, further comprising the step of determining the gain imbalance between said antennas prior to said selecting step.

57. The antenna selection method of claim 56, said gain imbalance determining step further comprising:

(a) recording gains from automatic gain controls used for signals from said antennas; and
(b) calculating the difference therebetween.

58. The antenna selection method of claim 52, further comprising the step of adjusting said compensated signal power for each combined signal based on noise encountered by said antennas.

59. The antenna selection method of claim 52, further comprising the step of adjusting said compensated signal power for each combined signal based on interference encountered by said antennas.

60. The antenna selection method of claim 52, further comprising the step of ensuring said signal is received only under said weighted condition of said selected combined signal for a specified time period.

61. The antenna selection method of claim 50, wherein said measuring step occurs during different time periods for each said combined signal.

62. The antenna selection method of claim 52, further comprising the following steps:

(a) continuously and periodically repeating said receiving, weighting, combining, measuring, determining, and selecting steps; and (b) updating the combined signal for reception of said signal to the combined signal providing the greatest compensated signal power.

63. The antenna selection method of claim 52, wherein said selecting step occurs prior to demodulation of said signal.

* * * * *